United States Patent [19]

Cook

[11] Patent Number: 4,612,603

[45] Date of Patent: Sep. 16, 1986

[54] METHOD OF MOUNTING AN APPLIANCE TO A BRACKET

[76] Inventor: David L. Cook, P.O. Box 1367, Christchurch, New Zealand

[21] Appl. No.: 613,503

[22] Filed: May 23, 1984

[30] Foreign Application Priority Data

May 24, 1983 [NZ] New Zealand ............... 204335

[51] Int. Cl.⁴ ................... H05K 7/02; H05K 7/04
[52] U.S. Cl. ..................... 361/419; 29/453; 29/426.6; 29/469; 220/3.9; 174/58; 248/221.4; 248/222.1; 248/DIG. 6
[58] Field of Search ............ 29/469, 453, 426.6; 248/221.4, 221.3, 222.1, DIG. 6; 361/417, 419, 427; 174/58; 220/3.5, 3.9

[56] References Cited

U.S. PATENT DOCUMENTS

| | | | |
|---|---|---|---|
| 3,001,755 | 9/1961 | Doyle | 248/221.4 X |
| 3,191,135 | 6/1965 | Hazelquist | 248/221.4 X |
| 3,640,497 | 2/1972 | Waki | 248/221.4 X |
| 3,688,635 | 9/1972 | Fegen | 361/419 |
| 3,970,276 | 7/1976 | Debaight | 248/221.3 |
| 4,334,659 | 6/1982 | Yuda | 248/221.4 |
| 4,403,708 | 9/1983 | Smolik | 220/3.5 |

FOREIGN PATENT DOCUMENTS 1141421 12/1962 Fed. Rep. of Germany ... 248/222.1

Primary Examiner—Charlie T. Moon
Attorney, Agent, or Firm—Scully, Scott, Murphy & Presser

[57] ABSTRACT

An assembly of an appliance and a bracket including a unique arrangement for locking the appliance and bracket together. Either the appliance or the bracket includes a male engaging member, and the other one of these elements includes a frame forming a female recess for receiving that male engaging member. The element that includes the frame also includes a locking ledge extending into the female recess to selectively engage the male engaging member and hold the appliance locked to the bracket, a releasing member extending through an aperture in the frame to push the male engaging member away from the ledge and unlock the appliance from the bracket, and a spring connecting the releasing member to the frame and biasing the releasing member away from the male engaging member.

15 Claims, 3 Drawing Figures

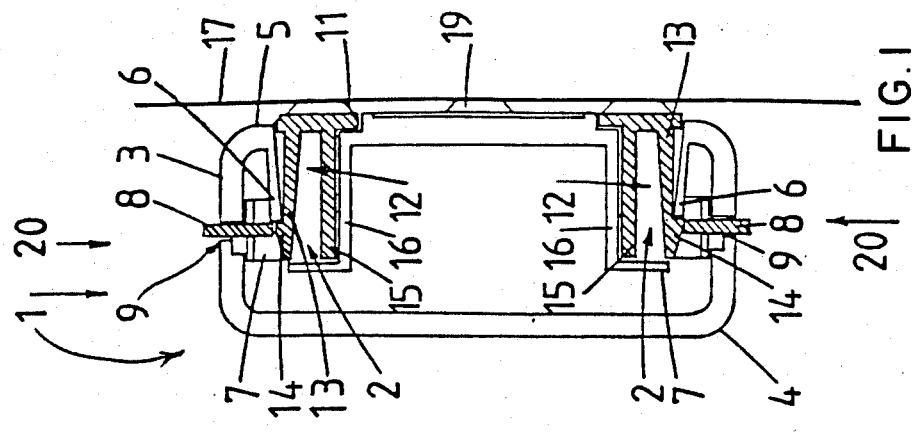
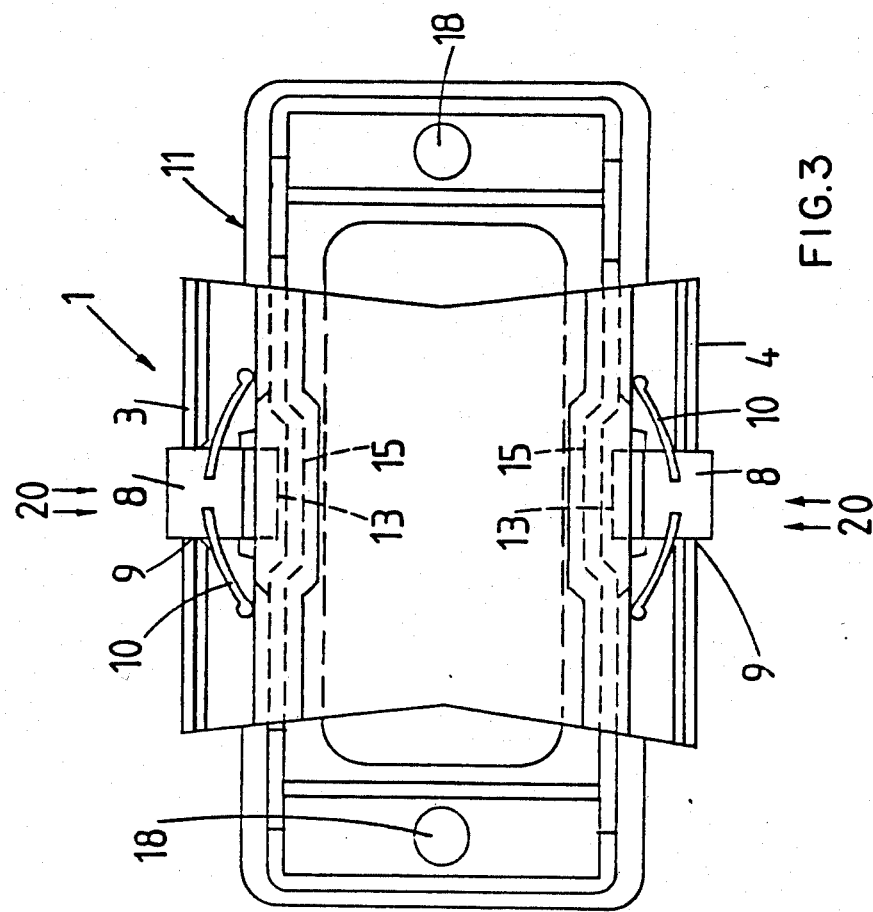

METHOD OF MOUNTING AN APPLIANCE TO A BRACKET

FIELD OF THE INVENTION

This invention relates to a method and apparatus for mounting an article appliance or fitting relative to an other surface, fitting or bracket.

DESCRIPTION OF THE PRIOR ART:

At present, for example, in the home appliance industry a number of constructions of appliance are available which normally rest on a floor or bench when being used. An example is a power board with a number of electric sockets which normally lies on a floor and has a series of appliance cords attached thereto. This system results in an untidy and dangerous mess.

An object of the invention is to provide a method and apparatus for mounting an appliance or fitting relative to an other surface or bracket which allows for simple and easy disengagement or engagement thereof from or to each other when necessary.

SUMMARY OF THE INVENTION

According to a first aspect of the present invention there is provided a method of mounting an appliance, to an other surface or bracket, the method including the steps of: forming in association with either an appliance or bracket at least one male engaging member; forming in association with the said bracket or the said appliance, a corresponding number of female recesses; forming in association with either at least one of the male engaging members or one of the female recesses a locking means; forming a releasing means in association with each locking means so that, in use, when the appliance is engaged with the said bracket each male engaging member is engaged in its corresponding female recess the releasing means can be operated to disengage the locking means to thereby allow the appliance to be disengaged therefrom.

According to a second aspect of the present invention there is provided an apparatus for mounting an appliance relative to a bracket, the apparatus including an appliance with at least one male engaging member formed thereon and a bracket having the same number of complementary female recesses formed therein, either one or each of the male engaging members or the female recesses having a locking means associated therewith so that, in use, when the appliance is engaged with the bracket each male engaging member is in its complementary female recess and can be disengaged therefrom by operating a releasing means which is adapted to disengage the locking means to allow the appliance to be moved from its association with the bracket.

According to a third aspect of the invention there is provided an apparatus for mounting an article to a bracket, the apparatus including an article with at least one female recess therein into each of which a complementary male engaging member on a bracket can be engaged, at least one of the recesses having a locking means and releasing means associated therewith so that, in use, the article can engage with the bracket with each male engaging member in its adjacent female recess, the article being disengageable from the bracket by operation of the releasing means which disengages the locking means to allow the article to be removed from the bracket.

The bracket or said other surface can be a mounting bracket manufactured in an injection moulding machine from a plastics material.

The mounting bracket can be formed with a pair of male members engageable with a pair of female recesses formed in the body of an electrical or the like appliance or fitting.

Further aspects of the present invention which should be considered in all its novel aspects will become apparent in the following description which is given by way of example only.

BRIEF DESCRIPTION OF THE DRAWINGS

An example of the present invention will now be described with reference to the accompanying drawings in which:

FIG. 1: shows a vertical cross section through an appliance body and mounting bracket incorporating the present invention;

FIG. 3: shows a front view of the mounting bracket shown in FIGS. 1 and 2 with part of the appliance body ghosted thereon.

DESCRIPTION OF THE PREFERRED EMBODIMENT

Figure 2:
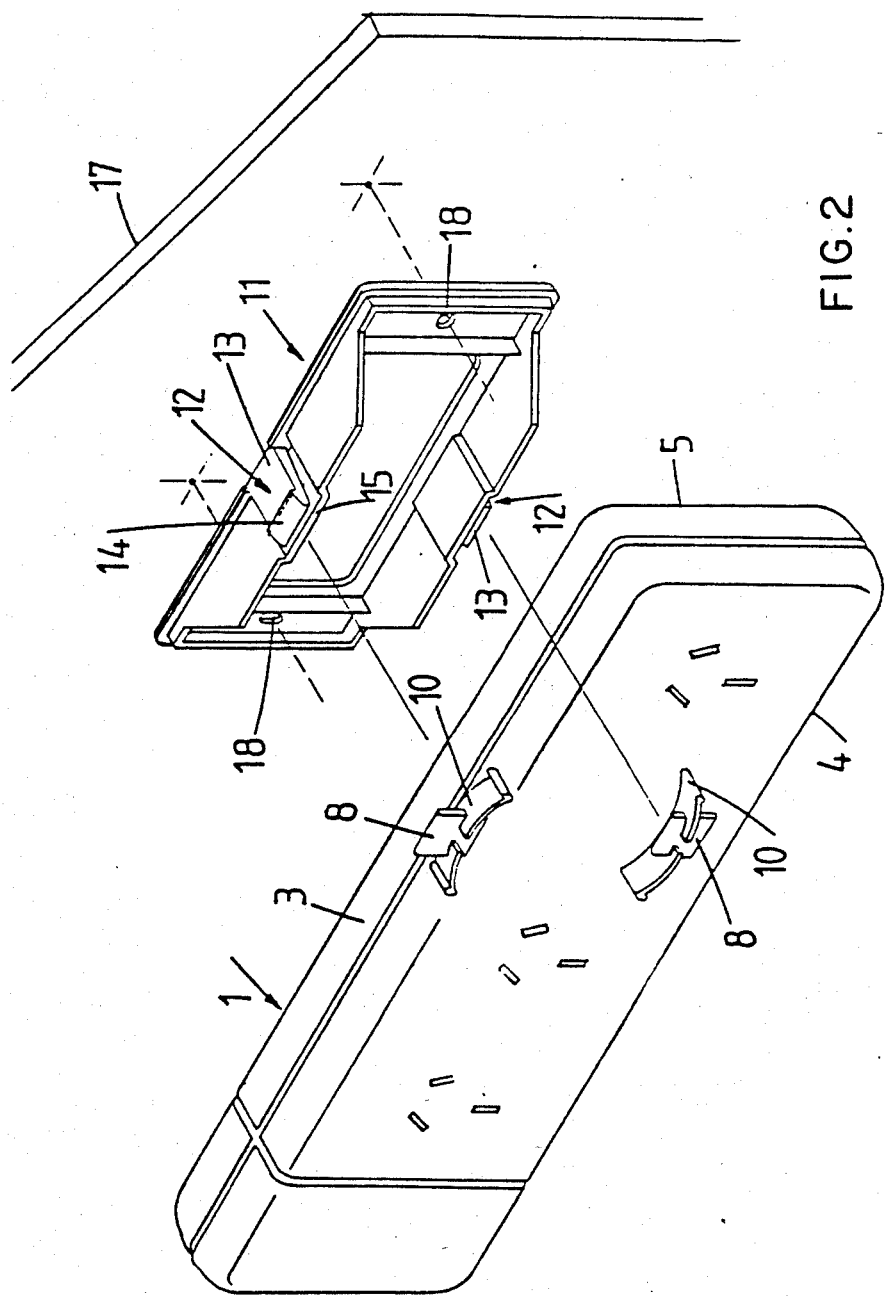
FIG. 2: shows a perspective view from above the front of the appliance body and mounting bracket shown in FIG. 1 wherein the appliance body and bracket are shown exploded apart for clarity and wherein part of the appliance body has been ghosted for clarity.

The example of the invention will be described with regard to an appliance body which is connectable to a bracket designed for fastening as a wall bracket.

The appliance body shown is a fitting including a plurality of electrical sockets which can include control switches and/or a contact/circuit breaker. The fitting which is generally indicated by arrow 1 can include a circuit breaker (or fuse) and has a cord and plug which extend from one end for engagement to a power source.

The fitting has incorporated therein, during manufacture, one or more female recesses. In the example the appliance 1 has a pair of female recesses 2 positioned near to the top 3 and bottom 4 respectively of the appliance body 1. The opening to each recess 2 is in a rear wall 5 of the appliance 1.

At least one of the recesses and in the example both of the recesses have in association therewith a locking means with an associated releasing means. In the example both of the recesses 2 have locking means and releasing means associated therewith. Each locking means is a ledge 6 formed toward an inner end 7 of the recess 2. The ledge 6 has associated therewith a release button 8 which extends through an aperture 9 in the wall of the appliance body 1. The release button 8 is biased by a biasing member 10 to its outward position i.e. the position shown in FIG. 1.

The appliance body 1 is adapted for engagement with a mounting bracket which incorporates a corresponding number of male engaging members positioned to engage in the female recesses incorporated in the appliance body 1. In the example the mounting bracket is generally indicated by arrow 11 and includes a pair of male engaging members 12. The bracket 11 has a central aperture incorporated so that the bracket 11 constitutes rectangular peripheral frame.

Each male engaging member 12 or at least part thereof is formed from a resilient material and includes a tongue 13 with a flange 14 near the end thereof. The flange 14 cooperates with the ledge 6 of the recess to lock the appliance body 1 relative to the mounting bracket 11. In the example the male engaging members 12 have a guide arm 15 as well as the member 12 to contact the opposite side 16 of the recess 2 to that with the ledge 6 to firmly locate the appliance to the bracket 11.

The mounting bracket 11 can include fixing means to enable it to be attached to a wall or counter surface 17 on which it is to be mounted. The fixing means can be a pair of holes 18 formed near to each end of the bracket 11.

The rear wall 5 of the appliance 1 can include stablising legs 19 so that, in use, when the fitting is used without the bracket 11 i.e. by placing same on a counter or bench it adopts a stable platform.

In use the appliance can be manufactured from any suitable material and preferably from a rigid plastic material in an injection moulding machine. The bracket can be manufactured from a similar material or fabricated and have at least the male members 12 formed from a resilient material to allow the appliance 1 to be clipped onto the bracket 11 with the members 12 locked into the recesses 2. In this position the stablising legs 19 extend through the aperture 21 to contact the surface 17 on which the bracket 11 is mounted. In order to release the appliance 1 the release buttons 8 are pressed inward in the direction of the arrows 20 to allow the flange 14 on the tongue 13 to disengage from the ledge 6. The appliance 1 can then be slid from in association with the members 12 and 15.

It is to be appreciated that, if desired, the appliance body can have the male engaging members formed integrally therewith, which members are engaged in recesses formed in the bracket.

It is also to be appreciated that with minor modifications thereto the present invention can be adapted to support any appliance, apparatus or fitting relative to any other surface, fitting or bracket. For example, the appliance can be mounted to the bracket on the rear wall of a cabinet or the appliance can be a kitchen appliance adapted to be held in position on a bench or similar surface.

In the example the electrical sockets shown are of the three-pin type as required by New Zealand Wiring regulations and it is to be appreciated that the configurement of the sockets including the number and shape of the pins thereof can vary to suit local wiring regulations.

Thus by this invention there is provided a method and apparatus for mounting an application, article or fitting relative to an other surface, fitting or bracket which engagement provides for a simple and relatively easy disengagement of the appliance article or fitting from the said other surface, fitting or bracket when necessary.

A particular example of the present invention has been described herein by way of example and it is to be appreciated that improvements and modifications thereto can take place without departing from the scope of the appended claims.

What I do claim and desire to obtain by Letters Patent of the United States is:

1. An assembly of an appliance and a bracket comprising:
   a bracket including at least one male engaging member; and
   an appliance including
   (i) a frame including at least one female recess for receiving the male engaging member,
   (ii) a locking ledge connected to the frame and extending into the female recess to selectively engage the male engaging member and hold the appliance locked to the bracket,
   (iii) a releasing member extending through an aperture in the frame to push the male engaging member away from the ledge and unlock the appliance from the bracket, and
   (iv) spring means connecting the releasing member to the frame and biasing the releasing member away from the male engaging member.

2. An assembly as claimed in claim 1 wherein the bracket is a mounting bracket manufactured in an injection molding machine from a plastic material, and the appliance is molded from a plastic material.

3. An assembly as claimed in claim 2 wherein the bracket includes a second male engaging member, and the appliance includes a second female recess for receiving the second male engaging member.

4. An assembly as claimed in claim 3 wherein the appliance is a power board including a series of electrical sockets, switches and a circuit breaker.

5. An assembly as claimed in claim 2 wherein the mounting bracket includes fixing means to facilitate fixing the bracket to a surface.

6. An assembly as claimed in claim 5 wherein the bracket includes a generally planar rectangular peripheral frame, and the fixing means includes a pair of holes respectively formed in opposite ends of the peripheral frame.

7. An assembly as claimed in claim 6 wherein the male engaging member extends away from the peripheral frame at a right angle thereto.

8. An assembly of an appliance and a bracket comprising:
   an appliance including at least one male engaging member; and
   a bracket including
   (i) a frame including at least one female recess for receiving the male engaging member,
   (ii) a locking ledge connected to the frame and extending into the female recess to selectively engage the male engaging member and hold the appliance locked to the bracket,
   (iii) a releasing member extending through an aperture in the frame to push the male engaging member away from the ledge and unlock the appliance from the bracket, and
   (iv) spring means connecting the releasing member to the frame and biasing the releasing member away from the male engaging member.

9. An assembly as claimed in claim 8 wherein the bracket is a mounting bracket manufactured in an injection molding machine from a plastic material, and the appliance is molded from a plastic material.

10. An assembly as claimed in claim 9 wherein the appliance includes a second male engaging member, and the bracket includes a second female recesses for receiving the second male engaging member.

11. An assembly an claimed in claim 10 wherein the appliance is a power board including a series of electrical sockets, switches and a circuit breaker.

12. An assembly as claimed in claim 9 wherein the mounting bracket includes fixing means to facilitate fixing the frame to a surface.

13. An assembly as claimed in claim 12 wherein the frame is a generally planar rectangular peripheral frame, and the fixing means includes a pair of holes respectively formed in opposite ends of the peripheral frame.

14. An assembly as claimed in claim 13 wherein the male engaging member extends at a right angle to the planar peripheral frame.

15. An assembly of an appliance and a bracket comprising:
  a bracket including
  (i) a generally planar rectangular frame,
  (ii) a male engaging member connected to the frame, and
  (iii) fixing means located at opposite ends of the frame to facilitate fixing the frame to a surface; and
  an appliance including
  (i) a frame including a rear wall, upper and lower edges, and a pair of female recesses respectively near to the upper and lower edges for receiving the male engaging member,
  (ii) stabilizing legs connected to and extending from the rear wall,
  (iii) a locking ledge connected to the frame and extending into each female recess to selectively engage the male engaging member and hold the appliance locked to the bracket,
  (iv) a releasing member extending through an aperture in the frame to push the male engaging member away from the ledge and unlock the appliance from the bracket, and
  (v) a plastics leaf spring connecting each releasing member to the frame and biasing the releasing member away from the male engaging member.

* * * * *